(12) United States Patent
Moore et al.

(10) Patent No.: US 8,498,807 B2
(45) Date of Patent: Jul. 30, 2013

(54) METHOD AND SYSTEM FOR PROVIDING EXPANDED ACCESS TO NAVIGATIONAL SERVICES

(75) Inventors: Devin C. Moore, Lewis Center, OH (US); Wade P. Thompson, Moore, SC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 324 days.

(21) Appl. No.: 12/904,462

(22) Filed: Oct. 14, 2010

(65) Prior Publication Data

US 2012/0095678 A1    Apr. 19, 2012

(51) Int. Cl.
*G01C 21/00*    (2006.01)

(52) U.S. Cl.
USPC ................... 701/409; 701/434; 340/995.17

(58) Field of Classification Search
USPC .. 701/400, 416, 426, 431, 434, 409; 340/988, 340/995.17
See application file for complete search history.

(56) References Cited

U.S. PATENT DOCUMENTS

| | | | | |
|---|---|---|---|---|
| 7,439,878 | B2 * | 10/2008 | Kato et al. | 340/988 |
| 7,587,274 | B2 * | 9/2009 | Kaldewey et al. | 701/434 |
| 2010/0023249 | A1 * | 1/2010 | Mays et al. | 701/200 |
| 2010/0211307 | A1 * | 8/2010 | Geelen | 701/201 |

* cited by examiner

*Primary Examiner* — Gertrude Arthur Jeanglaude

(57) ABSTRACT

An approach is provided for retrieving mapping information of a premise for use by a mobile device upon the mobile device reaching the premise. A prompt is generated for presentation by the mobile device for a destination point within the premise. A determination is made of the position information of the mobile device. Navigation information for guidance to the destination point is generated using the mapping information and the determined position information. Presentation of the navigation information is initiated via the mobile device.

18 Claims, 12 Drawing Sheets

METHOD AND SYSTEM FOR PROVIDING EXPANDED ACCESS TO NAVIGATIONAL SERVICES

BACKGROUND INFORMATION

Global Positioning System (GPS) technologies have seen considerable technological advancements, including availability and accuracy. With such advancements, GPS devices have found their way into millions of cars, cell phones, and standalone devices around the world, providing the ability for consumers to obtain, for instance, real-time routing information, e.g., turn-by-turn directions, while en route to a predetermined destination. However, due to relatively weak satellite signals, signal blockage from buildings and foliage, etc., there are many circumstances where GPS will not function, such as while indoors, in a tunnel, in an underground parking lot, etc. In addition, in comparison with outdoor navigation, indoor navigation is supported by much less environmental information (e.g., landmarks, orientation cues, etc.). As a result, navigating through an indoor environment can be far more challenging than performing the same task outside.

Therefore, there is a need for an approach that can efficiently and effectively provide expanded access to navigational services and additional navigation information.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing expanded access to navigational services and additional navigation information are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although the various exemplary embodiments are described with respect to global positioning system (GPS) technology, it is contemplated that various exemplary embodiments are also applicable to other equivalent navigational and location determination technologies, for example, a technology to detect the location based on available base station of cell phone network.

Figure 1:
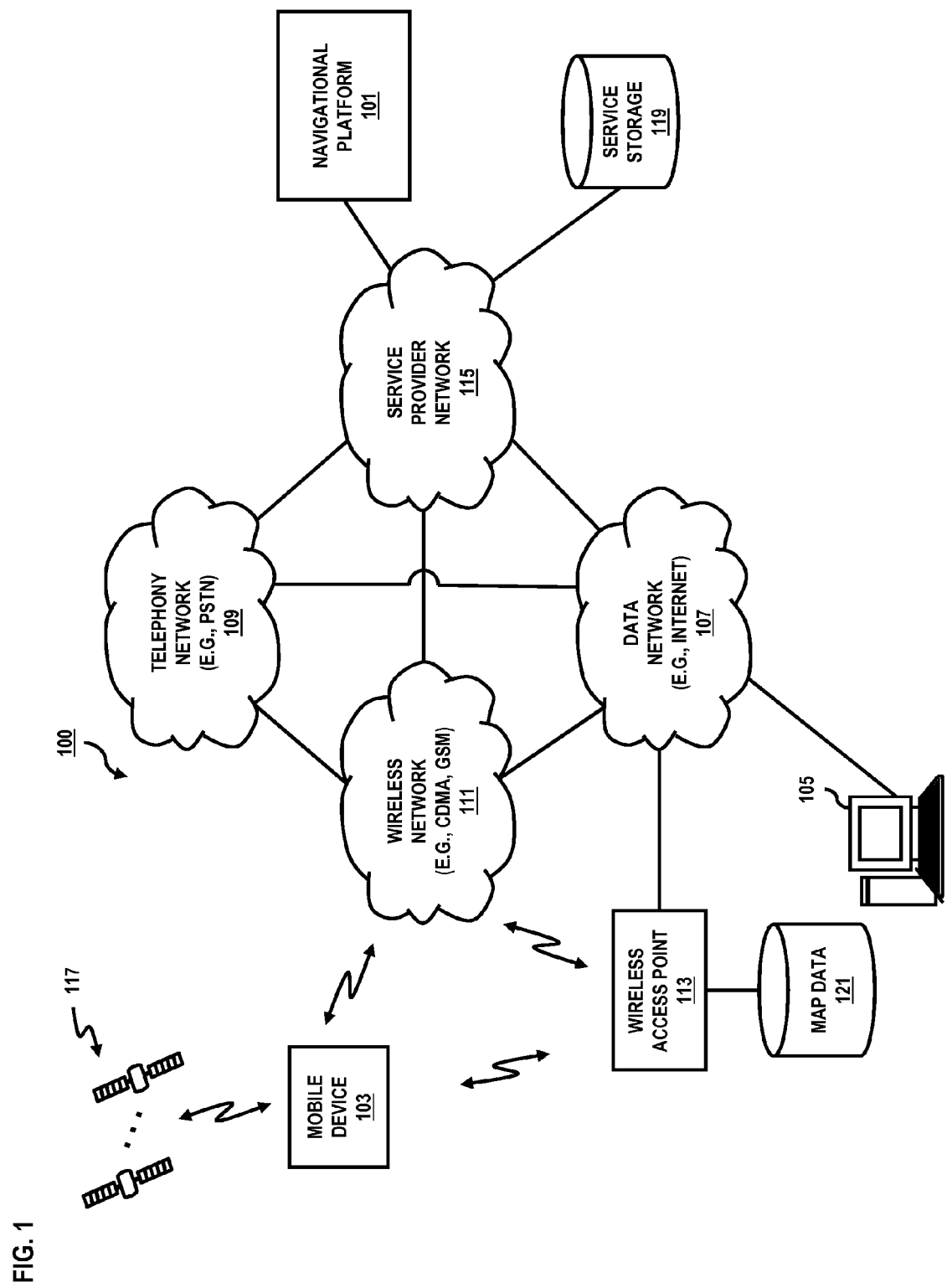
FIG. 1 is a diagram of a system configured to provide expanded access to navigational services and additional navigation information, according to an exemplary embodiment.

FIG. 1 is a diagram of a system capable of providing expanded access to navigational services and additional navigation information, according to an exemplary embodiment. For the purposes of illustration, system 100 includes a navigational platform 101 configured to provide expanded access to navigational services and additional navigation information to one or more client (or user) devices (e.g., mobile device 103, computing device 105, etc.) over one or more networks (e.g., data network 107, telephony network 109, wireless network 111, etc.) and/or through one or more access points (e.g., wireless access point 113). By way of example, such services are managed services offered by one or more service providers via a service provider network 115. As shown, the navigational platform 101 is connected to the service provider network 115.

In certain embodiments, the navigational services employ wireless (e.g., Wi-Fi) access points that can share maps on a specific information source—e g., uniform resource locator (URL). As such, GPS-enabled devices (e.g., mobile device 103) coming within range can automatically connect to a default URL and download map data (which can simply be the entire map itself, or navigation information derived from the map). In one embodiment, these devices can then remove the map data based on a set time after they are out of range of the network. In this manner, the GPS-enabled devices will then have the required maps upon reaching a predetermined proximity to the mapping location desired. This capability is more fully described below with respect to FIGS. 4-7.

According to certain embodiments, the navigational platform 101 may be included in or connected to the mobile device 103, the wireless access point 113, the service provider network 115, or a combination thereof. While specific reference will be made thereto, it is contemplated that system 100 may embody many forms and include multiple and/or alternative components and facilities.

Undoubtedly, GPS has become widely used for commerce, scientific experiments, tracking and surveillance, etc. One of the most common commercial uses of GPS has been in providing navigational services. For example, portable GPS devices, such as GPS-enabled cellular devices, GPS-enabled positioning technologies, GPS-enabled navigation devices, and the like, displays to users graphical and textual descriptions of locations and itineraries, and/or location-to-location navigational directions via graphical user interfaces (GUI) or other like representations. In addition, the GPS devices may even provide users with audio instructions in addition to the graphical and/or textual presentations. Typically, these GPS devices receive broadcast signals from GPS satellites in space (e.g., satellites 117), in order to provide, for instance, the ability for consumers to obtain, for instance, real-time routing information, e.g., turn-by-turn directions, while en route to a predetermined destination. However, as mentioned previously, there are many circumstances where GPS will not function, such as while indoors, in a tunnel, in an underground parking lot, etc., due to a number of reasons (e.g., weak or absent satellite signals).

Moreover, in comparison with navigation outdoors, navigation within an indoor environment is supported by much less environmental information (e.g., landmarks, orienting cues, etc.). For instance, a city or a town may have a number of environmental cues (e.g., tall buildings, statutes, bridges, rivers, etc.) that can act as landmarks to guide a user and to help the user create a mental spatial representation of the area. However, the benefits of the landmarks are generally lost when navigating indoors. Furthermore, indoor navigation lacks many orientation cues available outside, such as the consistency of city blocks, naming conventions of streets, and addressing of buildings, that may provide hints as to distance traveled, direction of movement, and location. As a result, navigating through an indoor environment can be far more challenging than performing the same task outside.

Therefore, the approach according to certain embodiments of system 100 stems from the recognition that consumers can benefit from expanded access to navigational services and additional or supplemental navigation information, whereby users can receive navigational services even when GPS may not be reliable (e.g., via wireless access points 113) and/or alternative ways of determining information about their environment where traditional cues (e.g., tall buildings, statutes, bridges, rivers, consistency of city blocks, naming conventions of streets, and addressing of buildings, etc.) may not be available. According to certain embodiments, GPS may still be used, in combination with other methods, to provide navigational services. For instance, GPS may be used to determine the position of a mobile device 103 in circumstances where GPS signals are strong and/or where GPS service is reliable. The navigational platform 101 may also provide mapping information, which may be stored at the service storage 119, with respect to the position of the mobile device 103. Thus, for example, the navigational platform 101 may retrieve mapping information of a premise for a mobile device 103 upon the arrival of the mobile device 103 on the premise. The navigational platform 101 may then generate a prompt on the mobile device 103 for a user to provide, as input, a destination within the premise. Assuming, for the purposes of this example, that GPS is available, GPS may be utilized to determine the position of the mobile device 103. Thereafter, the navigational platform 101 may generate the navigation information, at the mobile device 103, to guide the user to the destination using the retrieved mapping information and the determined position. Subsequently, the navigation information may be presented to the user via the mobile device 103.

According to certain other embodiments, the navigational platform 101 may detect the entry by a mobile device 103 into a premise. The navigational platform 101 may then determine whether to initiate transfer of mapping information of the premise to the mobile device 103. Based on the determination, the mapping information may be retrieved from a data repository (e.g., service storage 119, access point storage 121, etc.) over the data network 107. The navigational platform 101 may also retrieve a location signal from a location element situated within the premise, wherein the location signal is triggered by the mobile device 103. Based on the received location signal, the position information of the mobile device 103 may be determined. As such, the navigational platform 101 may also generate navigational information using the position information of the mobile device 103. The navigational platform 101 may then initiate transmission of the navigation information to the mobile device 103 over the data network 107. Further, according to various other embodiments, the navigational platform 101 may generate a control message instructing the mobile device 103 to present a prompt for offering the mapping information as a download, for instance.

However, as previously mentioned, GPS is not always reliable and/or available. Thus, system 100 may implement the use of access points, such as wireless access points 113), to provide expanded access to navigational services and additional navigation information. To determine the position of a mobile device 103, numerous methods may be used. According to certain embodiments, the position of a mobile device 103 may be determined using one or more location elements including a radio transponder, a wireless device (e.g., Wi-Fi, Bluetooth, RFID, etc.) such as wireless access points 113, or a combination thereof. The system 100 may, for instance, utilize these devices along with one or more location determination technologies, as discussed later in the sections describing FIG. 3, to determine the position of the mobile device 103.

According to various other embodiments, the manner of approach of the mobile device 103 into a premise that is served by a wireless access point 113 may be used to determine the position of entry into the premise. For example, the positions of the different entries (e.g., front door, side door, back door, etc.) into the premise may already be defined (e.g., predefined, user-defined, automatically defined). Accordingly, upon detecting the approach of the mobile device 103 into the range of a wireless access point 113, the navigational platform 101 may determine the position information by selecting the premise entry associated with the wireless access point 113 with the particular range that the mobile device 103 approached. Moreover, if the mobile device 103 approaches more than one wireless access point range (or a plurality of ranges associated with a plurality of wireless access points 113), the navigational platform 101 may determine the position information by selecting the premise entry associated with the most wireless access points 113 with ranges that the mobile device 103 approached. The system 100 may also determine the position information by selecting the premise entry associated with the wireless access point 113 from which the mobile device 103 is receiving the strongest signal. For instance, after detecting the approach of the mobile device 103 into the multiple ranges associated with a plurality of wireless access points 113, the user of the mobile device 103 may not yet be at the premise entry desired by the user. As the user continues toward the desired premise entry, the signals received from one or more wireless access points 113 may continue to become stronger, while the signals received from one or more other wireless access points 113 may continue to become weaker. The navigational platform 101 may then select, after some predetermined time, the premise entry associated with the wireless access point 113 from which the mobile device 103 is receiving the strongest signal as the position of entry by the mobile device 103 into the premise. As such, the navigational platform 101 may also determine the position information by selecting the premise entry associated with a set of wireless access points 113 from which the mobile device 103 is receiving the strongest set of signals. For example, the system may average the signals, received by the mobile device 103, of the wireless access points 113 associated with each premise entry, and then select the premise entry associated with the set of wireless access points 113 from which the mobile device 103 received signals of the highest average strength.

According to certain other embodiments, the loss of GPS signal may be used to determine the position information. The navigational platform 101 may, for instance, initially use GPS to determine the position information. However, in many circumstances, a GPS signal may be lost upon entering a premise (e.g., building, parking garage, tunnel, etc.). As such, the most recent position information determined, prior to the signal loss, may be used to determine the position of the mobile device 103. For example, the last GPS-determined location of the mobile device 103 may be utilized by the navigational platform 101 as the position information for the mobile device 103 in conjunction with the mapping information to provide the user with navigation information (e.g., graphical and textual descriptions of locations and itineraries, turn-by-turn directions, etc.). In another example, the last GPS-determined location of the mobile device 103 may simply be used to determine the position of entry into the premise by the mobile device 103. For instance, as previously mentioned, the positions of the different entries (e.g., front door, side door, back door, etc.) into the premise may already be defined (e.g., predefined, user-defined, automatically defined). Accordingly, the navigational platform 101 may determine the position information by selecting the premise entry that is closest to the last GPS-determined location of the mobile device 103 as the position of entry into the premise by the mobile device 103. As such, the navigational platform 101 may provide the user, via the mobile device 103, with navigation information based on the position of entry into the premise.

According to further embodiments, the position information may be determined for the mobile device 103 through user-input. The navigational platform 101 may, for instance, prompt the user, via the mobile device 103, for the position information. The user may then enter position information into the mobile device 103. The position information to be entered may include longitude/latitude points, addresses, intersections, etc. Further, the position information may be entered via a number of methods, such as typing in the information, touching a position on a map displayed by the mobile device 103, etc.

In addition, the system 100 may utilize wireless access points 113 to provide mobile devices 103 with mapping information. According to particular embodiments, mapping information of a premise may be retrieved for use by a mobile device 103 upon the mobile device 103 reaching the premise by accessing a wireless access point 113 or a memory of the mobile device 103. For example, if the wireless access point 113 can provide mapping information that is more up-to-date than and/or preferred over (e.g., preference as to type of mapping information may be predefined, user-defined, and/or automatically defined) the mapping information stored in the memory of the mobile device 103, then the wireless access point 113 will be accessed to retrieve the mapping information. The mapping information may actually be stored locally (e.g., the access point storage 121) or in one or more network repositories (e.g., the service storage 119). As such, it is noted that accessing the wireless access point 113 to retrieve the mapping information does not necessarily require (although it may) that the mapping information be obtained directly through the wireless access point 113. For example, the wireless access point 113 may simply provide a web address (e.g., URL) that may be used to obtain the mapping information for the premise. After retrieving the mapping information, the mapping information may be stored in the memory of the mobile device 103 for use.

According to further embodiments, if it is determined that the mapping information should be retrieved by accessing the wireless access point 113, the navigational platform 101 may prompt the user, via the mobile device 103, to offer the mapping information as a download. The user may then choose to download the mapping information offered or utilize the mapping information already located in the memory of the user's mobile device 103.

Because mapping information may not be complete (e.g., new construction area) and the size of the mapping information of a premise may be large, it may not be efficient and/or not feasible to store all the mapping data on the mobile device 103. Similarly, it may not be efficient and/or not feasible for each wireless access point 113 to include or be connected to an access point storage 121 for local storage of mapping data. Thus, according to various embodiments, mapping information may be shared using an information source address— e.g., Uniform Resource Locator (URL). Such source address can be a network address, a web address, an IP address, etc. As such, a mobile device 103 may, upon reaching a premise, connect to the default URL and download the mapping information for the premise. Likewise, according to other embodiments, a wireless access point 113 may, upon the mobile device 103 coming within range (i.e., predetermined proximity) of the wireless access point 113, connect to the default URL and provide the mapping information for the premise to the mobile device 103.

In certain embodiments, the mapping information may be stored in the memory of the mobile device 103 for a temporary amount of time, such as the duration of time that the mobile device 103 is on the premise or some set time thereafter. After such time, the mobile device 103 may dispose of the mapping information for the premise. As a result, neither the mobile device 103 nor the wireless access point 113 is required to store mapping data, which may advantageously reduce costs for both the service providers and the users that may purchase such devices by lowering the minimum requirements of memory and/or storage for these devices.

Figure 4:
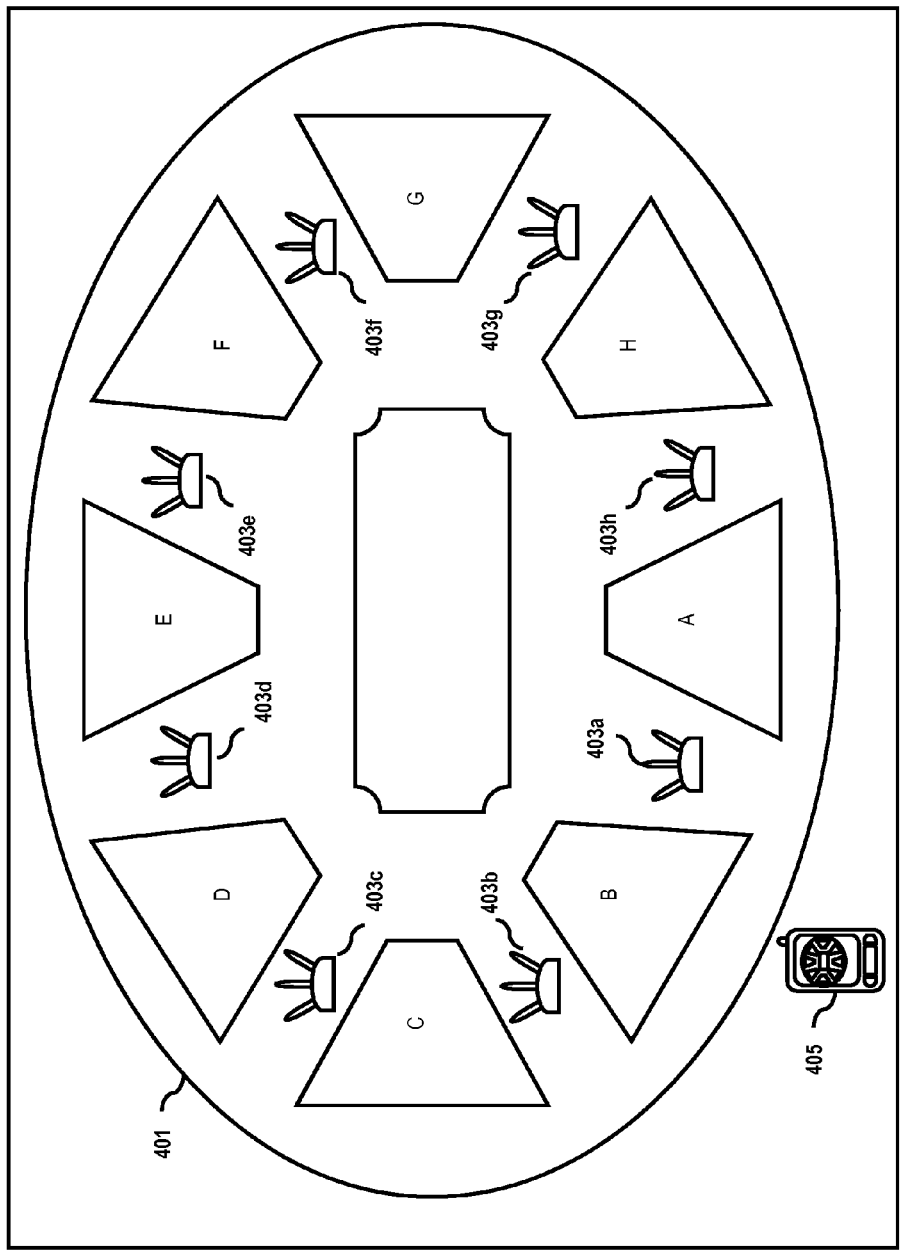
FIG. 4 is a diagram of a stadium with wireless access points to continue to provide access to navigational services within the stadium, according to an exemplary embodiment.

As previously mentioned, there are circumstances where traditional cues (e.g., tall buildings, statutes, bridges, rivers, consistency of city blocks, naming conventions of streets, and addressing of buildings, etc.) may not be available, such as in an indoor environment. As such, the navigational platform 101 may provide alternative ways to help users determine information about their environment. According to various embodiments, the navigation information may include images of the interior of the premise. For example, as shown in FIG. 4, the navigational platform 101 may provide a user with a photo-realistic and/or graphical representative overview of the premise (e.g., top view of the entire premise). As further shown in FIG. 8B, the overview image may be combined with other navigation information, such as routing information, to guide the user to the user's desired destination. In another example, as shown in FIG. 8C, the system 100 may use the user's desired destination to generate a series of photo-realistic and/or graphical representative portals/locations that the user must traverse to reach the destination. These portal/location images may be shown to the user, via the mobile device 103, one at a time (or a set of portal/location images at a time) such that each time the user traverses one portal/location (e.g., a door, stairs, hallway, etc.), the next portal/location image may be accessed by, for instance, a push of a button on the mobile device 103.

According to various other embodiments, the navigation information may provide such images when the mobile device 103 is not able to determine its position, for instance, within an indoor premise. As a result, a user may be able to navigate to the user's desired destination without the navigational platform 101 having to determine the position of the user within the premise. In other words, a static playback of navigational information can be provided when the device 103 and/or network 100 cannot supply location information, such as GPS data. Under such a scenario, the platform 101 can retain knowledge of the facility entry point or the user selects the facility entry point. The user then inputs the facility location of the destination point. In conjunction with the platform 101, the device 103 can display the navigation information to the user—e.g., by prompting the user to hit the "next" button each time a particular segment of the trip is completed. Additionally, this functionality can be invoked if navigational information is lost while the user is traversing the facility.

Figure 2:
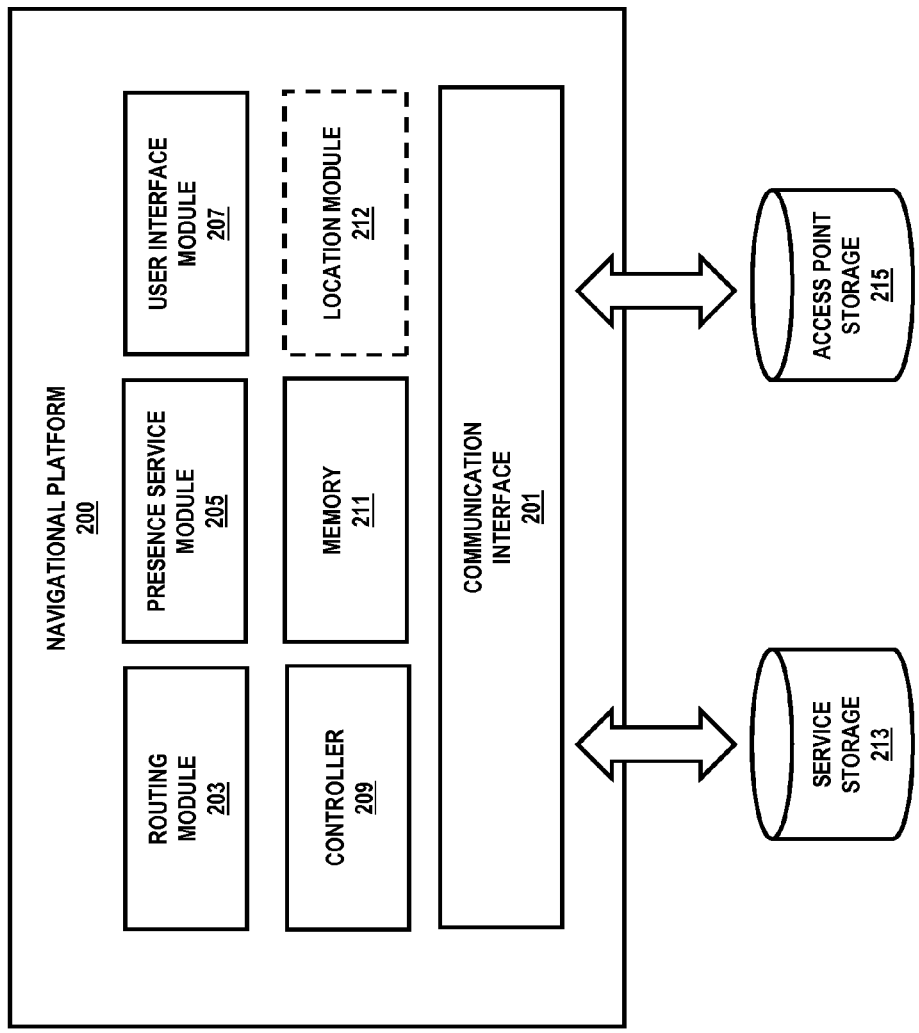
FIG. 2 is a diagram of a navigational platform configured to provide expanded access to navigational services and additional navigation information, according to an exemplary embodiment.

FIG. 2 is a diagram of a navigational platform configured to provide expanded access to navigational services and additional navigation information, according to an exemplary embodiment. The navigational platform 200 may comprise computing hardware (such as described with respect to FIG. 9), as well as include one or more components configured to execute the processes described herein for providing the navigational services of system 100. In one implementation, the navigational platform 200 includes a communication interface 201, a routing module 203, a presence service module 205, a user interface module 207, a controller (or processor) 209, and a memory 211. The navigational platform 200 may also communicate, via the communication interface 201, with one or more repositories, such as the service storage 213 and the access point storage 215. Further, users may access the navigational platform 200 via user devices (e.g., mobile device 103, computing device 105, etc.). It is also contemplated that the navigational platform 200 may embody many forms and include multiple and/or alternative components. For example, it is contemplated that the components of the navigational platform 200 may be combined, located in separate structures, or separate locations. Namely, a specific topology is not critical to embodiments of the navigational platform 200 or the system 100 for that matter.

As such, according to one embodiment, the navigational platform 200 embodies one or more application servers accessible to user devices (e.g., mobile device 103, computing device 105, etc.) over one or more networks (e.g., data network 107, telephony network 109, wireless network 111, etc.). Moreover, according to other embodiments, the navigational platform 200 may be included in or connected to the mobile device 103, the wireless access point 113, the service provider network 115, or a combination thereof.

The routing module 203 may be configured to retrieve mapping content from, for example, service storage 213 in order to generate one or more topological depictions (or maps) of various geographic areas, as well as plan one or more routes (or trips) from starting locations to ending (or destination) locations within the geographic areas. Determined routes may also include one or more intermediary locations. Routing directions, e.g., turn-by-turn directions, may also be generated by routing module 203, wherein determined routes, corresponding movements (e.g., merges, turns, etc.), and the like, can be overlaid on generated maps and provided to users at for, example, mobile device 103. The routing module 203 may utilize various link and node data corresponding to the geographic areas at least including the starting locations, end locations, and the one or more intermediary locations of a user. Additionally, the routing module 203 may utilize "current" spatial positioning of users to determine distances from various destinations. Distance values may be contingent upon a route that a user selects for navigational purposes. Likewise, the routing module 203 may also utilize the real-time positioning information, as well as end destinations to determine one or more ETAs for the end destinations. The routing module 203 may also be configured to dynamically provide ETA information for arriving at predetermined destinations corresponding to advertisement information. In this way, users can gain an appreciation for the extra amount of travel time that visiting an end destination or location associated with advertisement content will cause.

According to particular embodiments, the routing module 203 may generate this content (or information) "on-the-fly" based on real-time positioning information corresponding to the spatial position (or location) of a user. The real-time positioning information may be obtained from a mobile device of a user, e.g., mobile device 103, and tracked via the presence service module 205. Additionally, the presence service module 205 may "poll" mobile devices 103 for positioning information, as well as capture presence information or availability of mobile devices 103, i.e., of users to the navigational services of system 100. An exemplary model for presence determination is detailed in Internet Engineering Task Force (IETF) Request for Comment (RFC) 2778, which is incorporated herein by reference in its entirety. According to certain embodiments, the presence or availability of mobile devices (e.g., mobile device 103) may be utilized to initiate the navigational services of system 100.

In one embodiment, the navigational platform 200 includes an optional location module 212, which can assist with the determination of the location (or positional) information of the mobile device 103, such as by employing cellular identification information and triangulation techniques or assisted GPS (A-GPS) technology. A-GPS mitigates the loss of GPS signals from obstructions. Assistance data can be transmitted to the mobile device 103 over the wireless network 111 via the location module 212. Such data can include ephemeris data differential GPS correct data, timing data and/or other aiding data. Using the aiding (or assistance) data, the location module 212 performs geolocation calculations. Thus, with the location module 212, the navigational platform 200 can more accurately track the location of the mobile device 103.

The navigational platform 200 may also provide a user interface, e.g., a voice portal, web portal, or an otherwise networked application, to permit user access to the features and functionality of navigational platform 200 via, for instance, mobile devices 103. According to certain embodiments, the user interface module 213 may be configured for exchanging information between user devices (e.g., mobile device 103, computing device 105, etc.) and a web browser or other networked-based application or system, such as a voice browser or interactive voice recognition system. In exemplary embodiments, user interface module 213 executes a graphical user interface (GUI) application configured to provide users with one or more menus of options for creating, customizing, and managing their navigational services and requesting navigational information (e.g., routing directions, etc.), as well as engaging with other features of system 100.

Additionally, navigational platform 200 may include one or more controllers (or processors) 209 for effectuating the aforementioned managed navigational services, as well as one or more memories 211 for permanent or temporary storage of one or more of the aforementioned variables, parameters, criteria, or information.

Figure 3:
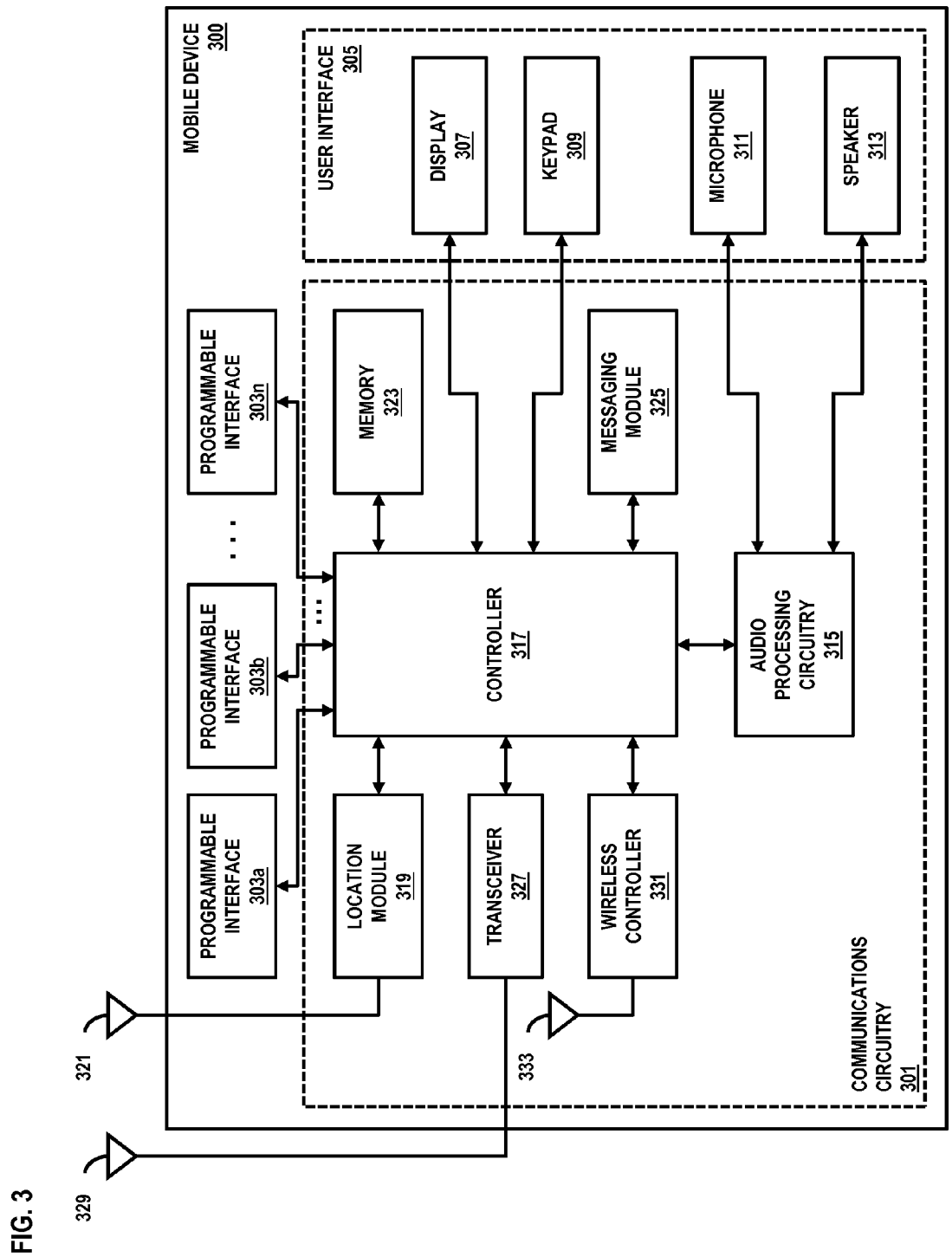
FIG. 3 is a diagram of a mobile device configured to facilitate expanded access to navigational services and additional navigation information, according to an exemplary embodiment.

FIG. 3 is a diagram of a mobile device configured to facilitate expanded access to navigational services and additional navigation information, according to an exemplary embodiment. Mobile device 300 may comprise computing hardware (such as described with respect to FIG. 9), as well as include one or more components configured to execute the processes described herein for facilitating the services of system 100. In this example, mobile device 300 includes communications circuitry 301, programming interfaces 303a-303n, and user interface 305. While specific reference will be made hereto, it is contemplated that mobile device 300 may embody many forms and include multiple and/or alternative components.

According to exemplary embodiments, user interface 305 may include one or more displays 307, keypads 309, microphones 311, and/or speakers 313. Display 307 provides a graphical user interface (GUI) that permits a user of mobile device 300 to view dialed digits, call status, menu options, and other service information. The GUI may include icons and menus, as well as other text and symbols. Keypad 309 includes an alphanumeric keypad and may represent other input controls, such as one or more button controls, dials, joysticks, touch panels, etc. As such, a user may utilize one or more components of user interface 305 to construct user profiles, enter commands, initialize applications, input remote addresses, select options from menu systems, and the like. In this manner, it is noted that microphone 311 coverts spoken utterances of a user (or other auditory sounds, e.g., environmental sounds) into electronic audio signals, whereas speaker 313 converts audio signals into audible sounds.

Communications circuitry 301 may include audio processing circuitry 315, controller 317, location module 319 (such as a GPS receiver) coupled to antenna 321, memory 323, messaging module 325, transceiver 327 coupled to antenna 329, and wireless controller 331 coupled to antenna 333. Memory 323 may represent a hierarchy of memory, which may include both random access memory (RAM) and read-only memory (ROM). Computer program instructions and corresponding data for operation can be stored in non-volatile memory, such as erasable programmable read-only memory (EPROM), electrically erasable programmable read-only memory (EEPROM), and/or flash memory. Memory 323 may be implemented as one or more discrete devices, stacked devices, or integrated with controller 317. Memory 323 may store information, such as position information, mapping information, navigation information, as well as one or more user profiles, one or more user defined policies, one or more contact lists, personal information, sensitive information, work related information, configurable setting parameters, and the like.

Even though not illustrated, it is contemplated that mobile device 300 may also include one or more applications and, thereby, may store (via memory 323) data (and/or setting parameters) associated with these applications for providing users with browsing functions, business functions, calendar functions, communication functions, contact managing functions, data editing (e.g., database, word processing, spreadsheets, etc.) functions, financial functions, gaming functions, imaging functions, location determination functions, messaging (e.g., electronic mail, instant messaging, enhanced messaging, multimedia messaging, short messaging, etc.) functions, multimedia functions, service functions, storage functions, synchronization functions, task managing functions, querying functions, and the like.

Accordingly, controller 317 may be configured to control the operation of mobile device 300, such as in response to commands received from programmable interfaces 303a-303n and/or data stored to memory 323. Control functions may be implemented in a single controller or via multiple controllers. Suitable controllers 317 may include, for example, both general purpose and special purpose controllers and digital signal processors. Controller 317 may interface with audio processing circuitry 315, which provides basic analog output signals to speaker 313 and receives analog audio inputs from microphone 311. It is noted that, in certain embodiments, control messages may be utilized to transmit spatial positioning information, memory images, etc., to one or more destinations via transceiver 327 and/or wireless controller 331. In this manner, controller 317 and/or one or more of programmable interfaces 303a-303n may be remotely configured and/or controlled via received control messages that cause mobile device 300 to perform one or more specified actions.

It is noted that real time spatial positioning information may be obtained or determined via location module 319 using, for instance, satellite positioning system technology, such as GPS technology. In this way, location module 319 can behave as (or substantially similar to) a GPS receiver. Thus, mobile device 300 employs location module 319 to communicate with constellation 117 of satellites. These satellites 117 transmit very low power interference and jamming resistant signals received by GPS receivers 319 via, for example, antennas 321. At any point on Earth, GPS receiver 319 can receive signals from multiple satellites, such as six to eleven. Specifically, GPS receiver 319 may determine three-dimensional geolocation (or spatial positioning information) from signals obtained from at least four satellites. Measurements from strategically positioned satellite tracking and monitoring stations are incorporated into orbital models for each satellite to compute precise orbital or clock data. Accordingly, GPS signals may be transmitted over two spread spectrum microwave carrier signals that can be shared by GPS satellites 117. Thus, if mobile device 300 is able to identify signals from at least four satellites 117, receivers 319 may decode the ephemeris and clock data, determine the pseudo range for each satellite 117 and, thereby, compute the spatial positioning of a receiving antenna 321. With GPS technology, mobile device 300 can determine its spatial position with great accuracy and convenience. It is contemplated, however, that location module 319 may utilize one or more other location determination technologies, such as advanced forward link triangulation (AFLT), angle of arrival (AOA), assisted GPS (A-GPS), cell identification (cell ID), observed time difference of arrival (OTDOA), enhanced observed time of difference (E-OTD), enhanced forward link trilateration (EFLT), network multipath analysis, and the like.

Mobile device 300 also includes messaging module 325 that is configured to receive, transmit, and/or process messages (e.g., EMS messages, SMS messages, MMS messages, IM messages, electronic mail messages, and/or any other suitable message) received from (or transmitted to) any suitable component or facility of system 100, as well as from (or to) one or more other mobile devices (not shown) or destinations. Furthermore, messaging module 325 may be further configured to parse setting parameters from these control messages and, thereby, port parsed setting parameters to corresponding components of mobile device 300, such as programmable interfaces 303a-303n, controller 317, location module 319, memory 323, transceiver 327, wireless controller 331, display 307, speaker 313, etc., for implementation. Accordingly, programmable interfaces 303a-303n (once activated) may be configured to effectuate one or more actions specified by received setting parameters, such as for remotely controlling, configuring, monitoring, tracking, etc., mobile device 300.

It is also noted that mobile device 300 can be equipped with wireless controller 331 to communicate with a wireless headset (not shown) or other wireless network. The headset can employ any number of standard radio technologies to communicate with wireless controller 331; for example, the headset can be BLUETOOTH enabled. It is contemplated that other equivalent short range radio technology and protocols can be utilized.

FIG. 4 is a diagram of a stadium with wireless access points to continue to provide access to navigational services within the stadium, according to an exemplary embodiment. In FIG. 4, the premise 401 is a stadium with sitting in, e.g., sections A-H. In this example, wireless access points 403a-403h are installed between the sitting sections A-H. As previously mentioned, each wireless access point 403a-403h may include or connect to a navigational platform 101. As a result, each wireless access point 403a-403h may provide navigational services to mobile devices 405 within the range of the particular wireless access point 403a-403h. Thus, in this particular example, upon the mobile device 405 reaching the premise 401, the navigational platform 101 of at least one of the wireless access points 403a-403h may generate navigation information including a graphical representative overview of the premise 401, and then provide the navigation information to the mobile device 405 to be presented to the user. Accordingly, the overview image is presented to the user via the mobile device 405 as depicted on the display of the mobile device 405 in FIG. 4.

Figure 5:
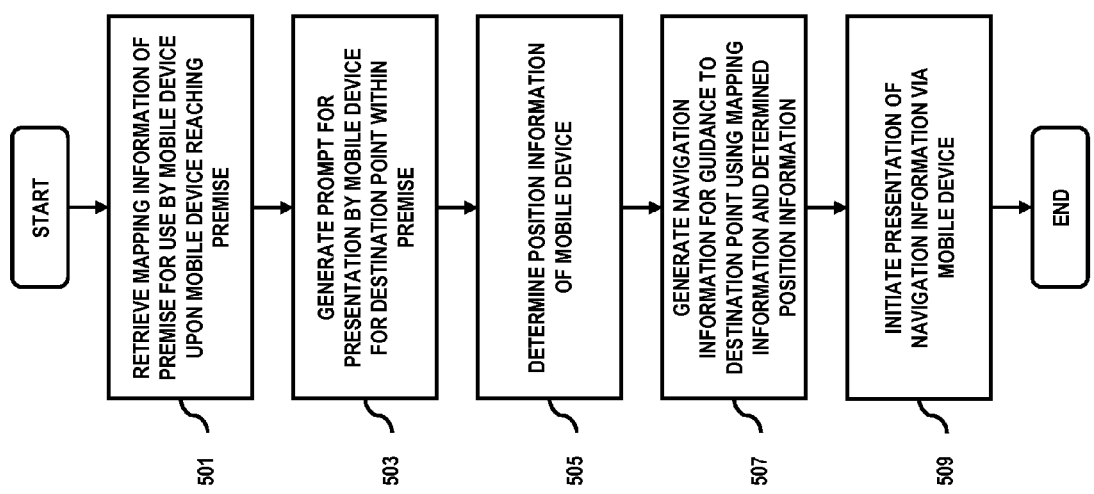
FIG. 5 is a flowchart of a process for providing expanded access to navigational services and additional navigation information, according to an exemplary embodiment.

FIG. 5 is a flowchart of a process for providing expanded access to navigational services and additional navigation information, according to an exemplary embodiment. For illustrative purposes, the process is described with reference to FIG. 1. It is noted that the steps of the process may be performed in any suitable order, as well as combined or separated in any suitable manner. According to certain embodiments, the navigational platform 101 may be included in or connected to the mobile device 103, the wireless access point 113, the service provider network 115, or a combination thereof. Thus, regardless of its location in the system 100, the navigational platform 101 retrieves, in step 501, mapping information of a premise for use by a mobile device 103 upon the mobile device 103 reaching the premise. According to certain other embodiments, the mapping information may be retrieved by accessing a wireless access point 113 or a memory of the mobile device 103. As such, the determination to access either the wireless access point 113 or the memory of the mobile device 103 may be based on which location contains mapping information of the premise that is more up-to-date and/or preferred (e.g., preference as to type of mapping information may be predefined, user-defined, and/or automatically defined). If a determination is made to access the wireless access point 113 to retrieve the mapping information, the mapping information may be retrieved locally (e.g., the access point storage 121), or from one or more network databases (e.g., the service storage 119). According to further embodiments, even if the navigational platform 101 determines that the mapping information should be retrieved by accessing the wireless access point 113, the user may still choose to use the mapping information located in the memory of the mobile device. For example, the navigational platform 101 may prompt the user, via the mobile device 103, to offer the mapping information as a download. The user then has the option to download the mapping information offered or utilize the mapping information already located in the memory of the user's mobile device 103.

According to various other embodiments, mapping information may be shared using a specific URL; although it is contemplated that other information source addresses, e.g., a network address, a web address, an IP address, etc. can be used. As such, the navigational platform 101 may, after obtaining the URL, connect to the URL and download the mapping information for the premise. As a result, neither the mobile device 103 nor the wireless access point 113 is required to store the mapping information in memory or in a local storage, reducing the minimum requirements for memory and/or storage in these devices. For example, the mapping information for a premise, if needed by the mobile device 103, may be stored in the memory of the mobile device only for the duration of time that the mobile device 103 is on the premise or some set time thereafter. After such time, the mobile device 103 may dispose of the mapping information for the premise.

At step 503, the navigational platform 101 generates a prompt for presentation by the mobile device 103 for a destination point within the premise. The user may then enter a desired destination into the mobile device. The destination information to be entered may include longitude/latitude points, addresses, intersections, etc. Further, the position information may be entered via a number of methods, such as typing in the destination information, touching a position on a map displayed by the mobile device 103, etc.

At step 505, the navigational platform 101 determines position information of the mobile device 103. As mentioned earlier, numerous methods may be used to determine the position of the mobile device 103. According to certain embodiments, GPS may be utilized to determine the position of the mobile device 103. However, as discussed in the sections describing FIG. 6A-6B, other methods to determine the position of the mobile device 103 may be used. According to further embodiments, the position information may be determined for the mobile device 103 through user-input. The navigational platform 101 may, for instance, prompt the user, via the mobile device 103, for the position information. The user may then enter position information into the mobile device. The position information to be entered may include longitude/latitude points, addresses, intersections, etc. Further, the position information may be entered via a number of methods, such as typing in the information, touching a position on a map displayed by the mobile device 103, etc.

At step 507, the navigational platform 101 generates navigation information for guidance to the destination point using the mapping information and the determined position information. The navigation information may include graphical and textual descriptions of locations and itineraries, turn-by-turn directions, etc. as well as traditional cues (e.g., tall buildings, statutes, bridges, rivers, consistency of city blocks, naming conventions of streets, and addressing of buildings, etc.) to guide the user to the user's desired destination. According to various embodiments, the navigation information may include images of the interior of the premise. As shown in FIG. 4, the user may be provided with a photo-realistic and/or graphical representative overview of the premise (e.g., top view of the entire premise). As further shown in FIG. 8B, the overview image may be combined with other navigation information, such as routing information, to guide the user to the user's desired destination. Moreover, as shown in FIG. 8C, the system 100 may use a user's desired destination to generate a series of photo-realistic and/or graphical representative portals/locations that the user must traverse to reach the destination. These portal/location images may be shown to the user, via the mobile device 103, one at a time (or a set of portal/location images at a time) such that each time the user traverses one portal/location (e.g., a door, stairs, hallway, etc.), the next portal/location image can be accessed by, for instance, a push of a button on the mobile device 103. According to various other embodiments, the navigation information may provide such images when the mobile device 103 is not able to determine its position, for instance, within an indoor premise. As such, a user may be able to navigate to the user's desired destination without the navigational platform 101 having to determine the user's position within the premise. At step 509, the navigational platform 101 then initiates presentation of the navigation information via the mobile device.

Figure 6B:
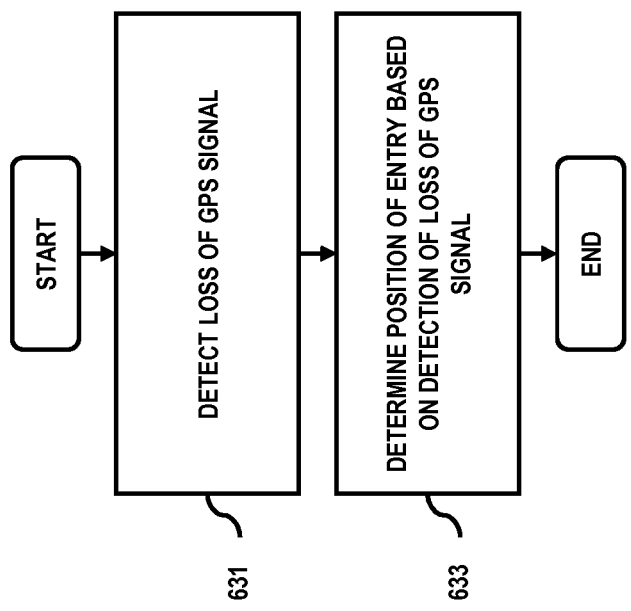
FIGS. 6A-6B are flowcharts of processes for determining position information, according to various exemplary embodiments.
Figure 6A:
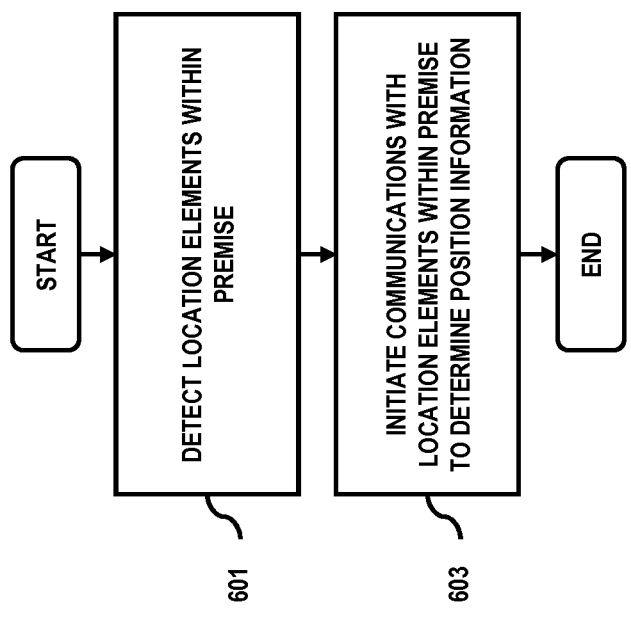

FIGS. 6A-6B are flowcharts of processes for determining position information, according to various exemplary embodiments. As mentioned earlier, there are many circumstances where GPS functionality is not available. As such, other methods of determining position information may be needed. Accordingly, FIG. 6A is a flowchart of a process for determining position information using one or more location elements within the premise. For illustrative purposes, the process is described with reference to FIG. 1. It is noted that the steps of the process may be performed in any suitable order, as well as combined or separated in any suitable manner. At step 601, the navigational platform 101 detects one or more location elements within the premise. At step 603, the navigational platform 101 initiates communications with the one or more location elements within the premise to determine the position information. The location elements may include, for instance, a radio transponder (not shown), a wireless access point 113, or a combination thereof. These devices may be utilized along with one or more location determination technologies, as discussed previously in the sections describing FIG. 3, to determine the position of the mobile device 103.

In addition, according to various other embodiments, the approach of a mobile device 103 into the range of a location element may be used to determine the position of entry into a premise. For example, the positions of the different entries (e.g., front door, side door, back door, etc.) into the premise may already be defined (e.g., predefined, user-defined, automatically defined). Accordingly, the navigational platform 101 may determine the position information by selecting the premise entry associated with the location element with the particular range that the mobile device 103 approached. Moreover, if the mobile device 103 approaches more than one location element range (or a plurality of ranges associated with a plurality of location elements), the navigational platform 101 may determine the position information by selecting the premise entry associated with the most location element with ranges that the mobile device 103 approached. The navigational platform 101 may also determine the position information by selecting the premise entry associated with the location element from which the mobile device 103 is receiving the strongest signal. For instance, after detecting the approach of the mobile device 103 into various ranges associated with multiple of location elements, the user of the mobile device 103 may not yet be at the premise entry desired by the user. As the user of the mobile device 103 continues toward the desired premise entry, the signals received from one or more locations elements may continue to become stronger, while the signals received from one or more other location elements may continue to become weaker. The navigational platform 101 may then select, after some predetermined time, the premise entry associated with the wireless access point 113 from which the mobile device 103 is receiving the strongest signal as the position of entry by the mobile device 103 into the premise. As such, the navigational platform 101 may also determine the position information by selecting the premise entry associated with a set of location elements from which the mobile device 103 is receiving the strongest set of signals. For example, the navigational platform 101 may average the signals, received by the mobile device 103, of the location elements associated with each premise entry, and then select the premise entry associated with the set of location elements from which the mobile device 103 received signals of the highest average strength.

FIG. 6B is a flowchart of a process for determining position information using the loss of GPS signal. For illustrative purposes, the process is described with reference to FIG. 1. It is noted that the steps of the process may be performed in any suitable order, as well as combined or separated in any suitable manner. For instance, at step 631, the navigational platform 101 detects the loss of the GPS signal. For the purposes of this section, the position information may relate to a position of entry into a premise by a mobile device 103. Accordingly, the navigational platform 101 then determines, in step 633, the position of entry based on the detection of the loss of the GPS signal. For instance, GPS may initially be used to determine the position of the mobile device 103. However, in many circumstances, a GPS signal may be lost upon entering a premise (e.g., building, parking garage, tunnel, etc.). Thus, in one example, the last GPS-determined location, prior to detecting the loss of the GPS signal, of the mobile device 103 may be utilized to determine the position information. For instance, as previously mentioned, the positions of the different entries (e.g., front door, side door, back door, etc.) into the premise may already be defined (e.g., predefined, user-defined, automatically defined). Accordingly, the navigational platform 101 may determine the position information by selecting the premise entry closest to the last GPS-determined location of the mobile device 103 as the position of entry into the premise by the mobile device 103. As such, the navigational platform 101 may provide the user, via the mobile device 103, with navigation information based on the position of entry into the premise.

Figure 7:
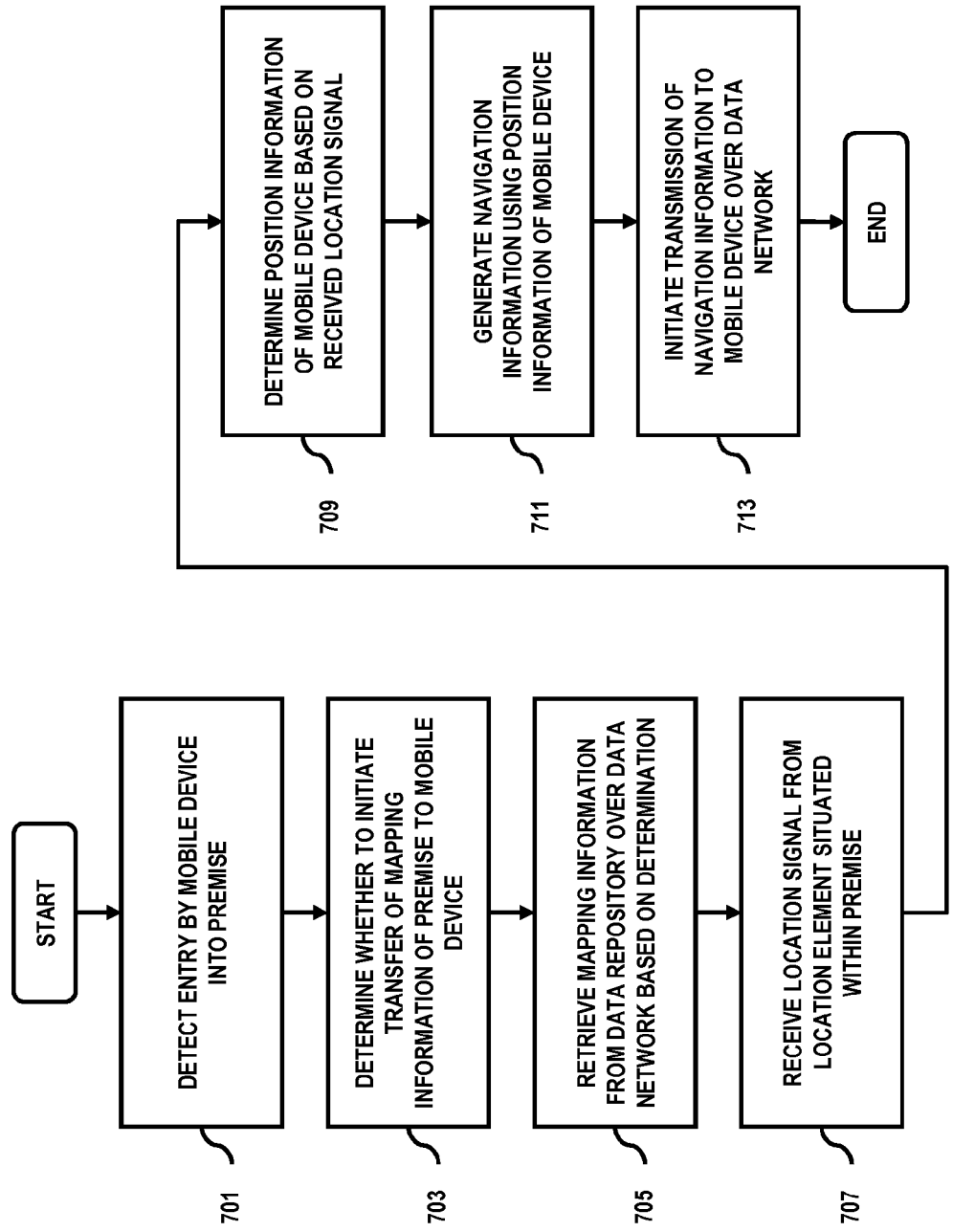
FIG. 7 is a flowchart of a process for providing expanded access to navigational services and additional navigation information, according to an exemplary embodiment.

FIG. 7 is a flowchart of a process for providing expanded access to navigational services and additional navigation information, according to an exemplary embodiment. For illustrative purposes, the process is described with reference to FIG. 1. It is noted that the steps of the process may be performed in any suitable order, as well as combined or separated in any suitable manner. For instance, at step 701, the navigational platform 101 detects entry by a mobile device (e.g., device 103) into a premise. The navigational platform 101 then determines, in step 703, whether to initiate transfer of mapping information of the premise to the mobile device. As previously mentioned, the determination may be based on whether the mobile device or another accessible location (e.g., access point storage 121, service storage 119, etc.) contains mapping information of the premise that is more up-to-date and/or preferred (e.g., preference as to type of mapping information may be predefined, user-defined, and/or automatically defined). Subsequently, in step 705, the navigational platform 101 retrieves the mapping information from a data repository over a data network based on the determination. As mentioned earlier, the retrieval of the mapping information from the data repository may include the use of a URL.

At step 707, the navigational platform 101 further receives a location signal from a location element situated within the premise. For example, the location element may send the location signal upon detecting the arrival of the mobile device 103 on the premise. As such, the location signal received from the location element may have been triggered by the mobile device 103. According to various embodiments, the navigational platform 101 may receive one or more signals from one or more location elements situated within the premise. As noted, the location elements may include a radio transponder, a wireless device (e.g., Wi-Fi, BLUETOOTH, RFID, etc.) such as wireless access points 113, or a combination thereof. The navigational platform 101 then determines, in step 709, position information of the mobile device 103 based on the received location signal. In addition, if multiple location signals is received from multiple location elements, the position information of the mobile device 103 may be determined based on one or more of the location signals. For example, the received location signals may be utilized along with one or more location determination technologies, as discussed previously in the sections describing FIG. 3, to determine the position of the mobile device 103.

At step 711, the navigational platform 101 generates navigation information using position information of the mobile device 103. As previously described, the navigation information may include images of the interior of the premise. For example, the images may include a photo-realistic and/or graphical representative overview of the premise. Moreover, the images may include a series of photo-realistic and/or graphical representative portals/locations to guide the user to the user's desired destination. Subsequently, at step 713, the navigational platform 101 initiates transmission of the navigation information to the mobile device 103 over the data network.

Figure 8A:
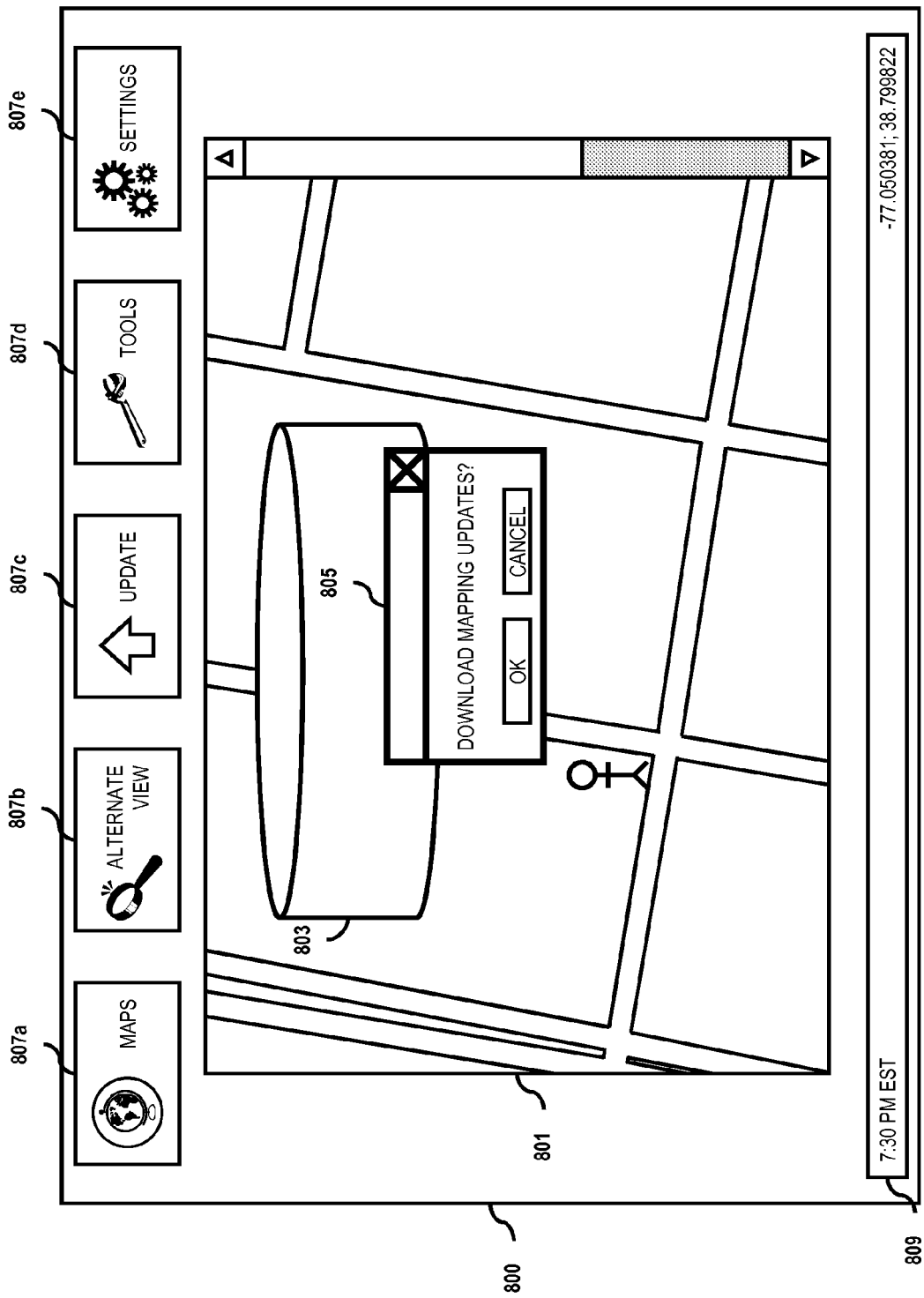
FIGS. 8A-8C are diagrams of a user interface for providing expanded access to navigational services and additional navigation information, according to various exemplary embodiments.
Figure 8B:
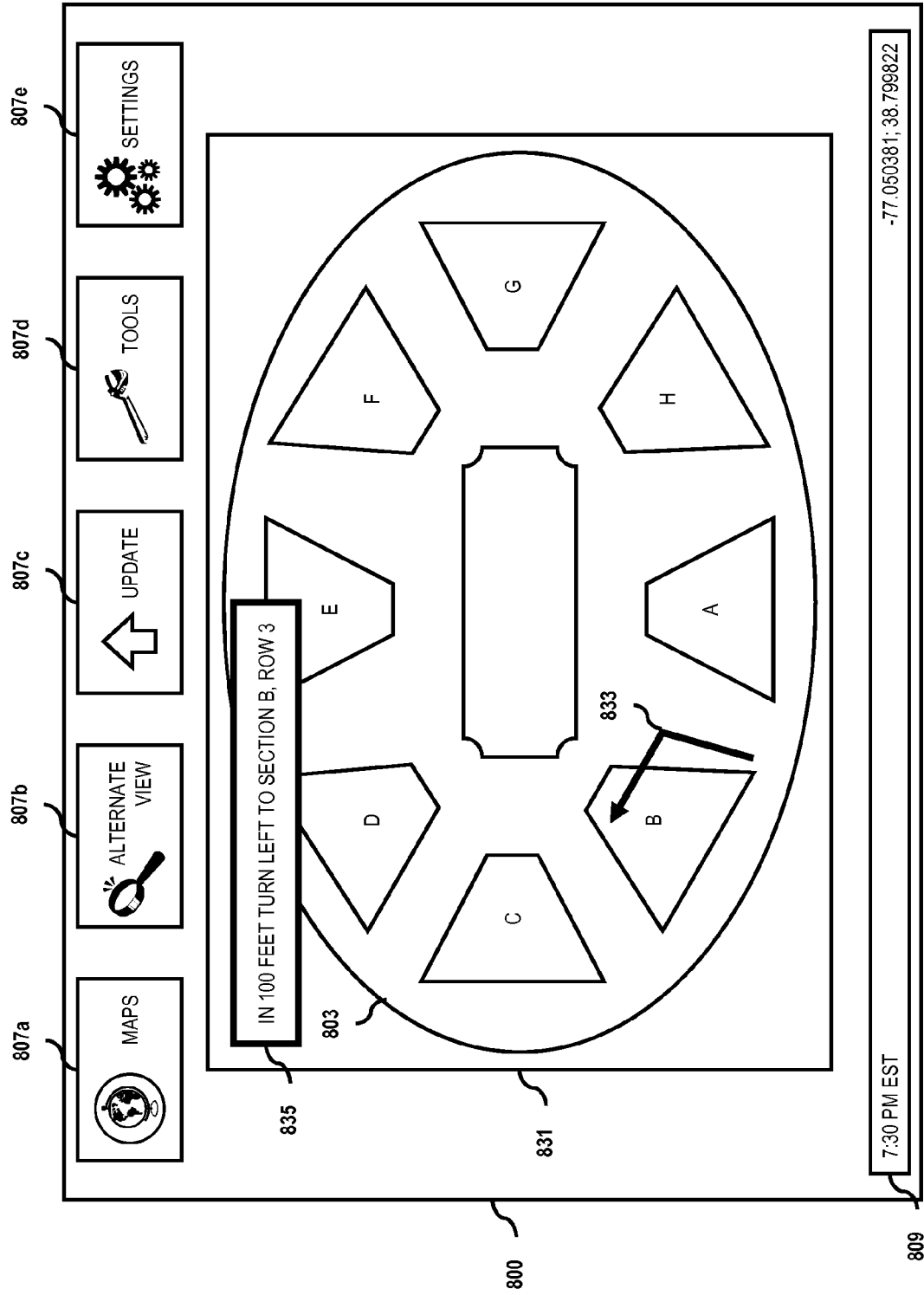
Figure 8C:
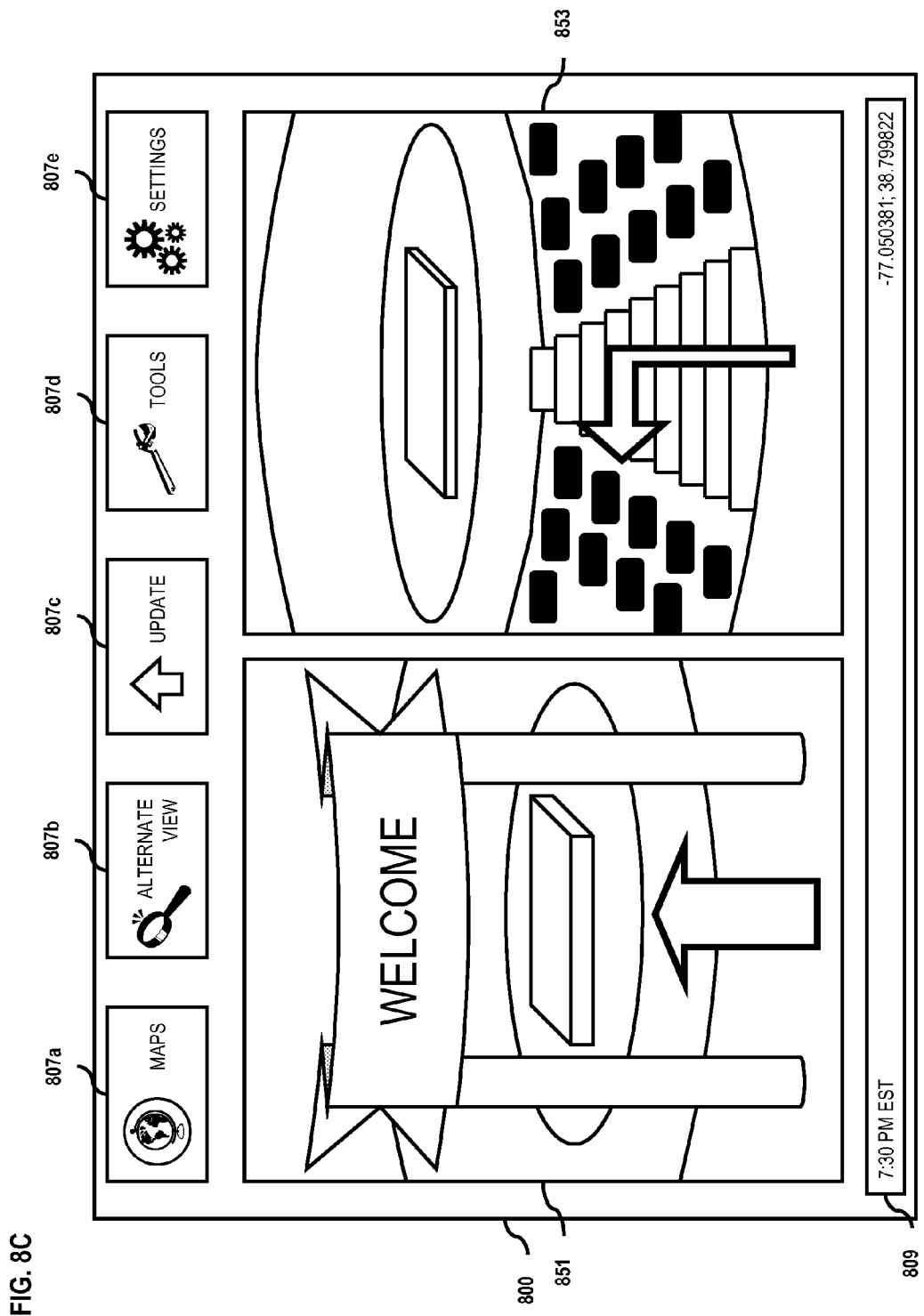

FIGS. 8A-8C are diagrams of a user interface for providing expanded access to navigational services and additional navigation information, according to various exemplary embodiments. For illustrative purposes, the diagrams are described with reference to FIG. 1. For instance, FIG. 8A is a diagram of the user interface 800 featuring a outdoor map 801, a stadium 803, the position of the mobile device 103, and a prompt 805 offering updated mapping information as a download. The user interface 800 further features user options 807a-807e, such as maps, alternate view, update, tools, and settings, and an information bar 809 displaying the time, the time zone, and the location of the mobile device 103 in a longitude/latitude format. In this example, the navigational platform 101 made the determination that the wireless access point 113 should be accessed to retrieve the mapping information for the stadium 803 upon the mobile device 103 reaching the premise of the stadium 803. Accordingly, the navigational platform 101 generates a control message instructing the mobile device 103 to present the prompt 805 to the user for the purpose of offering the updated mapping information as a download. As shown, the prompt 805 is presented, via the mobile device 103, offering the updated mapping information as a download.

FIG. 8B is a diagram of the user interface 800 featuring an interior overview map 831 of the stadium 803, an arrow 833 indicating where the user of the mobile device 103 should go to reach the user's desired destination, and turn-by-turn directions 835 indicating to the user of the mobile device 103 to turn left to section B, row 3 in 100 feet. The user interface 800 further features the user options 807a-807e, such as maps, alternate view, update, tools, and settings, and the information bar 809 displaying the time, the time zone, and the location of the mobile device 103 in a longitude/latitude format. In this example, the navigational platform 101 may have been able to determine the position of the mobile device 103 and, thus, may have determined that presenting the user with the interior overview map 831 was the most appropriate way to guide the user to the user's desired destination.

FIG. 8C is a diagram of the user interface 800 featuring graphical representative portals/locations 851 and 853 that the user of the mobile device 103 will be instructed to traverse in order to get to the user's desired destination. The user interface 800 further features the user options 807a-807e, such as maps, alternate view, update, tools, and settings, and the information bar 809 displaying the time, the time zone, and the location of the mobile device 103 in a longitude/ latitude format. In this example, the navigational platform 101 may not have been able to determine the position of the mobile device 103 and, thus, may have determined that presenting the user with a series of graphical representative portals/locations (e.g., graphical representative portals/locations 851 and 853) was the most appropriate way to guide the user to the user's desired destination. On the other hand, the navigational platform 101 may have been able to determine the position of the mobile device 103 and, thus, may have initially presented the user with the interior overview map 831 as shown in FIG. 8B. However, because the series of graphical representative portals/locations may have been the user's preferred method of navigation assistance, the user may have selected the graphical representative portals/locations map view via, for instance, the user option 807b (i.e., "Alternate View").

The processes described herein for providing expanded access to navigational services and additional navigation information may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
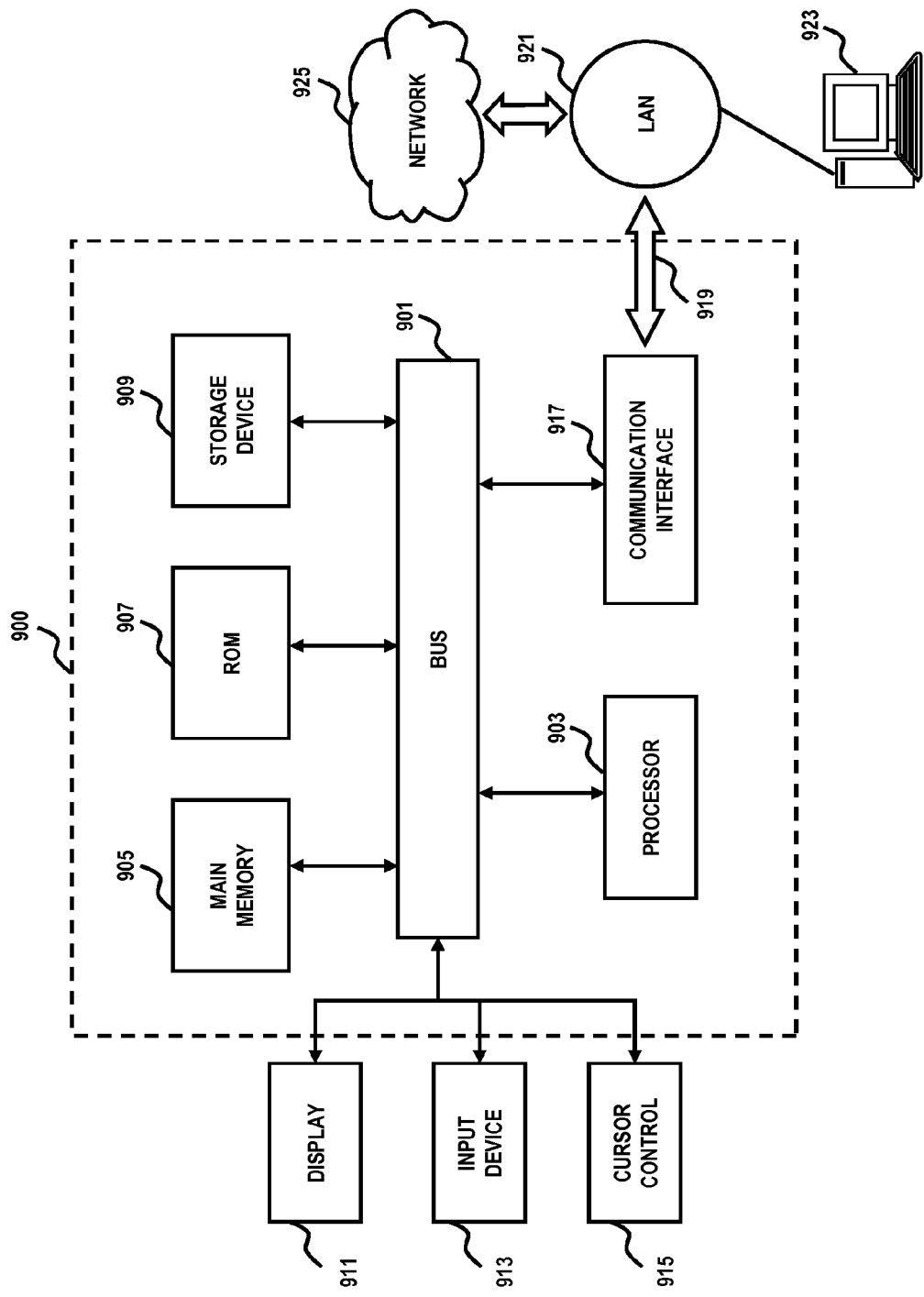
FIG. 9 is a diagram of a computer system that can be used to implement various exemplary embodiments.

FIG. 9 illustrates computing hardware (e.g., computer system) 900 upon which exemplary embodiments can be implemented. The computer system 900 includes a bus 901 or other communication mechanism for communicating information and a processor 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to an exemplary embodiment, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement exemplary embodiments. Thus, exemplary embodiments are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an exemplary embodiment through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 10:
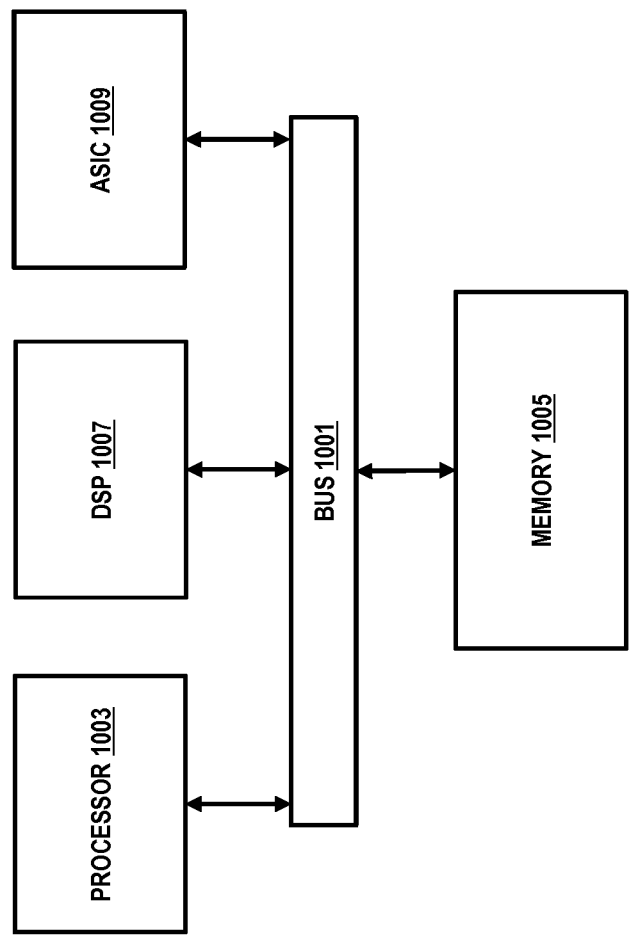
FIG. 10 is a diagram of a chip set that can be used to implement various exemplary embodiments.

FIG. 10 illustrates a chip set 1000 upon which an embodiment of the invention may be implemented. Chip set 1000 is programmed to present a slideshow as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of FIGS. 5-7.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1005 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   retrieving mapping information of a premise for use by a mobile device upon the mobile device reaching the premise;
   generating a prompt for presentation by the mobile device for a destination point within the premise;
   determining position information of the mobile device;
   generating navigation information for guidance to the destination point using the mapping information and the determined position information; and
   initiating presentation of the navigation information via the mobile device,
   wherein the navigation information includes images of the interior of the premise and each of the images corresponds to a different location of the interior of the premises, and
   wherein, during the guidance to the destination point, each time a user traverses one location, a next location image is accessed by the user for presentation by the mobile device, and each location image includes routing information on the image to guide the user.

2. A method according to claim 1, further comprising:
   accessing a wireless access point or a memory of the mobile device to retrieve the mapping information.

3. A method according to claim 1, further comprising:
   determining the position information using a global positioning system (GPS) signal.

4. A method according to claim 3, wherein the position information relates to a position of entry into the premise by the mobile device, the method further comprising:
   detecting loss of the GPS signal; and
   determining the position of entry based on the detection of the loss of the GPS signal.

5. A method according to claim 1, wherein the step of determining the position information of the mobile device includes:
   prompting a user, via the mobile device, for the position information.

6. A method according to claim 1, further comprising:
   prompting a user, via the mobile device, to offer the mapping information as a download.

7. A method according to claim 1, further comprising:
   initiating communications with one or more location elements within the premise to determine the position information, wherein the location elements include a radio transponder, a wireless access point, or a combination thereof.

8. An apparatus comprising:
   at least one processor; and
   at least one memory including computer program code for one or more programs,
   the at least one memory and the computer program code configured to, with the at least one processor, cause the apparatus to perform at least the following,
      retrieve mapping information of a premise for use by a mobile device upon the mobile device reaching the premise,
      generate a prompt for presentation by the mobile device for a destination point within the premise,
      determine position information of the mobile device,
      generate navigation information for guidance to the destination point using the mapping information and the determined position information, and
      initiate presentation of the navigation information via the mobile device,
      wherein the navigation information includes images of the interior of the premise and each image corresponds to a different location of the interior of the premises, and
      wherein, during the guidance to the destination point, each time a user traverses one location, a next location image is accessed by the user for presentation by the mobile device, and each location image includes routing information on the image to guide the user.

9. An apparatus according to claim 8, wherein the apparatus is further caused to:
   access a wireless access point or a memory of the mobile device to retrieve the mapping information.

10. An apparatus according to claim 8, wherein the apparatus is further caused to:
    determine the position information using a global positioning system (GPS) signal.

11. An apparatus according to claim 10, wherein the position information relates to a position of entry into the premise by the mobile device, the apparatus being further caused to:
    detect loss of the GPS signal; and
    determine the position of entry based on the detection of the loss of the GPS signal.

12. An apparatus according to claim 8, wherein the step of determining the position information of the mobile device includes causing the apparatus to:
    prompt a user, via the mobile device, for the position information.

13. An apparatus according to claim 8, the apparatus is further caused to:
    prompt a user, via the mobile device, to offer the mapping information as a download.

14. An apparatus according to claim 8, the apparatus is further caused to:
    initiate communications with one or more location elements within the premise to determine the position information, wherein the location elements include a radio transponder, a wireless access point, or a combination thereof.

15. A method comprising:
    detecting entry by a mobile device into a premise;
    determining whether to initiate transfer of mapping information of the premise to the mobile device;
    retrieving the mapping information from a data repository over a data network based on the determination;
    receiving a location signal from a location element situated within the premise, wherein the location signal is triggered by the mobile device;
    determining position information of the mobile device based on the received location signal;

generating navigation information using position information of the mobile device; and initiating transmission of the navigation information to the mobile device over the data network, wherein the navigation information includes images of the interior of the premise and each image corresponds to a different location of the interior of the premises, and wherein, during the guidance to a destination point, each time a user traverses one location, a next location image is accessed by the user for presentation by the mobile device, and each location image includes routing information on the image to guide the user.

16. A method according to claim 15, further comprising:

generating a control message instructing the mobile device to present a prompt for offering the mapping information as a download.

17. An apparatus comprising:

at least one processor; and at least one memory including computer program code for one or more programs, the at least one memory and the computer program code configured to, with the at least one processor, cause the apparatus to perform at least the following, detect entry by a mobile device into a premise, determine whether to initiate transfer of mapping information of the premise to the mobile device, retrieve the mapping information from a data repository over a data network based on the determination, receive a location signal from a location element situated within the premise, wherein the location signal is triggered by the mobile device, determine position information of the mobile device based on the received location signal, generate navigation information using position information of the mobile device, and initiate transmission of the navigation information to the mobile device over the data network, wherein the navigation information includes images of the interior of the premise and each image corresponds to a different location of the interior of the premises, and wherein, during guidance to a destination point, each time a user traverses one location, a next location image is accessed by the user for presentation by the mobile device, and each location image includes routing information on the image to guide the user.

18. An apparatus according to claim 17, wherein the apparatus is further caused to:

generate a control message instructing the mobile device to present a prompt for offering the mapping information as a download.

* * * * *